US010189428B1

(12) United States Patent
Sellars et al.

(10) Patent No.: US 10,189,428 B1
(45) Date of Patent: Jan. 29, 2019

(54) MOUNTING ASSEMBLY FOR MOUNTING A BUMPER ASSEMBLY AND A RADIATOR ASSEMBLY TO A VEHICLE, A VEHICLE FRAME, AND A VEHICLE

(71) Applicant: Honda Motor Co., Ltd., Tokyo (JP)

(72) Inventors: Daniel T. Sellars, West Liberty, OH (US); Luke M. Upah, Williamsburg, IA (US); Dakota D. Kirtland, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/911,818

(22) Filed: Mar. 5, 2018

(51) Int. Cl.
| | |
|---|---|
| *B60K 11/04* | (2006.01) |
| *B60R 19/34* | (2006.01) |
| *B62D 25/08* | (2006.01) |
| *B62D 21/15* | (2006.01) |
| *B62D 21/18* | (2006.01) |

(52) U.S. Cl.
CPC ............ *B60R 19/34* (2013.01); *B62D 21/152* (2013.01); *B62D 21/183* (2013.01); *B62D 25/084* (2013.01); *B60K 11/04* (2013.01); *B60Y 2200/20* (2013.01)

(58) Field of Classification Search
CPC ....... B60R 19/24; B60R 19/34; B62D 21/152; B62D 21/183; B62D 25/084; B60K 11/04; B60Y 2200/20
See application file for complete search history.

(56) References Cited

U.S. PATENT DOCUMENTS

| | | | |
|---|---|---|---|
| 2,936,842 A | 5/1960 | Fallin et al. | |
| 6,604,765 B1 | 8/2003 | Eull | |
| 6,925,735 B2 | 8/2005 | Hamm et al. | |
| 9,932,073 B2* | 4/2018 | Dube | B60K 15/063 |
| 2011/0073288 A1* | 3/2011 | Hirukawa | B60K 11/08 165/104.34 |
| 2013/0175779 A1* | 7/2013 | Kvien | B60G 3/20 280/124.15 |
| 2013/0319785 A1* | 12/2013 | Spindler | B62D 23/005 180/292 |
| 2015/0343973 A1* | 12/2015 | Stoenescu | B60R 19/03 293/133 |

(Continued)

FOREIGN PATENT DOCUMENTS

| | | |
|---|---|---|
| DE | 2727517 A1 | 12/1978 |
| DE | 102012008832 A1 | 10/2013 |
| EP | 1323566 A1 | 7/2003 |

(Continued)

*Primary Examiner* — Brian L Swenson
(74) *Attorney, Agent, or Firm* — Honda Patents & Technologies North America, LLC; Clifford B Vaterlaus

(57) ABSTRACT

The disclosed subject matter relates to a mounting assembly for connecting a bumper assembly and radiator assembly to a vehicle. The mounting assembly can include a first frame member extending along a vertical direction of the vehicle, a transverse frame member extending in a transverse direction of the vehicle and connected to the first frame member, a bumper bracket configured to connect the connector member of the bumper assembly to each of the first frame member and the transverse frame member. The bumper bracket can include a flange extending in the transverse direction of the vehicle, and the flange can be configured to engage the radiator assembly if the radiator assembly is mounted on the vehicle.

20 Claims, 11 Drawing Sheets

(56) References Cited

U.S. PATENT DOCUMENTS

2016/0039373 A1\* 2/2016 Yamada ............... B62D 25/085
 293/132
2016/0325700 A1 11/2016 Wheeler

FOREIGN PATENT DOCUMENTS

| | | |
|---|---|---|
| FR | 2958885 A1 | 10/2011 |
| JP | 3763230 B2 | 4/2006 |
| WO | 2005085009 A1 | 9/2005 |
| WO | 2005105552 A2 | 11/2005 |

\* cited by examiner

MOUNTING ASSEMBLY FOR MOUNTING A BUMPER ASSEMBLY AND A RADIATOR ASSEMBLY TO A VEHICLE, A VEHICLE FRAME, AND A VEHICLE

BACKGROUND

The disclosed subject matter relates to a vehicle and a frame assembly for the vehicle. More particularly, the disclosed subject matter relates to methods and apparatus that enhance load and energy management performance upon application of external loads and stresses, such as may occur during off-road travel over uneven terrain. Further, the disclosed subject matter relates to an assembly for mounting a bumper and radiator as well as the associated vehicle and vehicle frame that includes the assembly.

Vehicles, such as but not limited to all-terrain vehicles, can be subjected to relatively large load and/or energy inputs to the frame assembly due to the unevenness of the terrain across which the vehicle is travelling. The all-terrain vehicle can include a generally rigid frame assembly that is designed to withstand the load and energy inputs transmitted from the wheels and through the suspension components during travel over the uneven terrain. However, portions of the frame assembly, or one or more sub-assemblies mounted on the frame assembly can be configured to deform in a controlled and predictable manner if the portion of the frame assembly or the sub-assembl(ies) is/are subjected to a load or energy input that meets or exceeds at least one predetermined threshold. There is a need for a bumper mount bracket that can be used to assist in the controlled transfer of energy throughout the frame of the vehicle, and in particular to mount the bumper of a vehicle (e.g. ATV or Utility Vehicle) while also serving as a radiator mount. There is also a need to use such a mount bracket to control relative movements of the radiator and bumper assembly when certain forces are applied or when certain kinetic energy is observed in vehicle components.

SUMMARY

Some embodiments are directed to a mounting assembly for connecting each of a bumper assembly and a radiator assembly to a vehicle. The bumper assembly can include a connector member extending along a longitudinal direction of the vehicle. The mounting assembly can include a first frame member, a transverse frame member, and a bumper bracket. The first frame member can extend along a vertical direction of the vehicle. The transverse frame member can extend in a transverse direction of the vehicle and connected to the first frame member. The bumper bracket can be configured to connect the connector member of the bumper assembly to each of the first frame member and the transverse frame member. The bumper bracket can include a flange extending in the transverse direction of the vehicle. The flange can be configured to engage the radiator assembly if the radiator assembly is mounted on the vehicle.

Some embodiments are directed to a frame assembly of a vehicle that can include a pair of first frame members, a transverse frame member, a pair of bumper brackets, and a pair of connector members. The first frame members can extend upwardly along a vertical direction of the vehicle. The transverse frame member can extend from each of the first frame members in a transverse direction of the vehicle. Each of the bumper brackets can include a first portion and a second portion. The first portion can be connected to the transverse frame member and a respective one of the first frame members. The second portion of each of the bumper brackets can be configured to engage a radiator assembly when the radiator assembly is mounted on the frame assembly. Each of the connector members can be connected to the first portion of a respective one of the bumper brackets. Each of the connector members can extend along the longitudinal direction of the vehicle away from a respective one of the first frame members.

Some embodiments are directed to an all-terrain vehicle that can include a frame assembly, a radiator assembly, a rear suspension and wheel assembly, and a front suspension and wheel assembly. The frame assembly can include a main frame assembly, a rear frame assembly, and a front frame assembly. The main frame assembly can define a passenger compartment of the all-terrain vehicle. The rear frame assembly can be connected to and can extend from a rear end of the main frame assembly in a longitudinal direction of the all-terrain vehicle. The front frame assembly can be connected to and can extend from a front portion of the main frame assembly of the vehicle such that the main frame assembly extends between the front frame assembly and the rear frame assembly in a longitudinal direction of the vehicle. The rear suspension and wheel assembly can be mounted to the rear frame assembly, and the front suspension and wheel assembly can be mounted to the front frame assembly. The front frame assembly can include a pair of first frame members, a transverse frame member, a pair of bumper brackets, and a pair of connector members. The pair of first frame members can extend upwardly along a vertical direction of the vehicle. The transverse frame member can extend in a transverse direction of the vehicle and can be connected to each of the first frame members. The pair of bumper brackets can include a first portion and a second portion. The first portion can be connected to the transverse frame assembly and a respective one of the first frame members. Each of the connector members can be connected to the first portion of a respective one of the bumper brackets. Each of the connector members can extend in a longitudinal direction of the vehicle away from the transverse frame member. The radiator assembly can be connected to each of the first frame members and can engage the second portion of the each of the bumper brackets. The bumper brackets can be open toward the radiator assembly such that the connector members pivot upwardly and displace the radiator assembly upwardly and away from the front bumper assembly when the front bumper assembly is subjected to a load or kinetic energy input that causes the front bumper assembly to collapse toward the main frame assembly.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
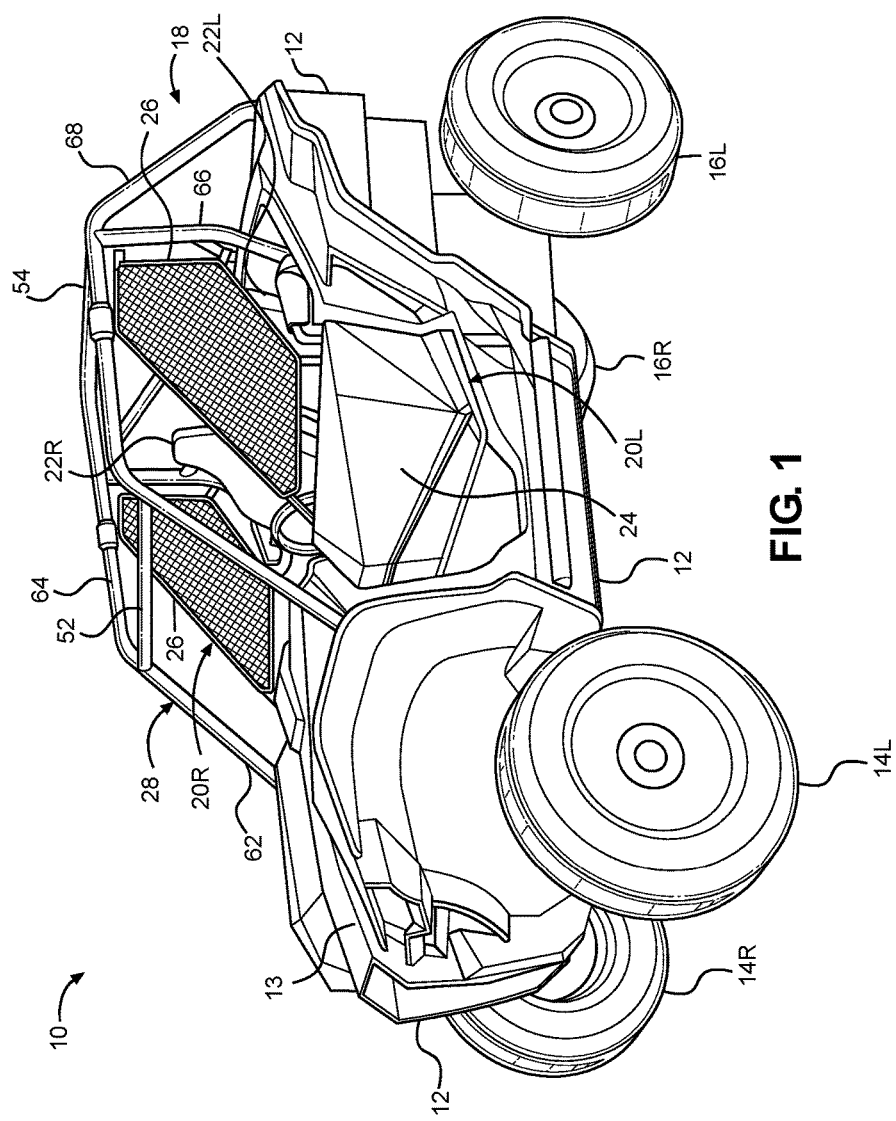
FIG. 1 is a perspective view of a vehicle made in accordance with principles of the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Various vehicular design factors may make it challenging to sufficiently impede or prevent deformation of the vehicle frame defining the passenger area upon application of significant force inputs into the frame assembly. The stiff portions of the vehicle frame that are spaced from the passenger area, such as but not limited to frame structures around the front suspension components, rear suspension components and/or powertrain components, can transmit most of or the entire load or kinetic energy input to the portion of the vehicle frame defining the passenger area. Typical vehicle frame design constraints and requirements may also limit the use of structures for managing the input load or kinetic energy. As a result, the portion of the vehicle frame defining the passenger area can be subject to deformation due to the input load or kinetic energy.

Further, one or more systems, components and/or assemblies may be mounted on the portion of the frame assembly and/or on the sub-assemblies that are configured to deform in a controlled and predictable manner. Any one of these systems, components and/or assemblies can be subjected to damage by the deforming frame assembly or sub-assemblies.

It may therefore be beneficial to provide a vehicle and a frame for the vehicle with an apparatus that addresses at least one of the above and/or other challenges of related art vehicles. In particular, it may be beneficial to enhance input load and energy management performance upon application of an external load, such as by controlling deformation of the vehicle frame and/or mitigating energy transmission to the passenger area caused by the input load or kinetic energy. For example, portions of the vehicle frame assembly can be configured to absorb and transfer, in a predetermined controlled manner, the load or kinetic energy that originated from the input load or kinetic energy. Furthermore, relative movement of certain structures, such as the radiator and the bumper, can be controlled through the use of particularly designed and placed mount structures to provide favorable movement characteristics and further enhance input load and energy management performance of the vehicle and vehicle frame.

In some of these and/or other embodiments, the vehicle frame can be configured to deform at portions spaced from the passenger area. In addition, the frame can be configured with structures that can displace one or more systems, components and/or assemblies mounted on the deforming portion of the frame and/or sub-assemblies away from the deforming portion of the frame and/or sub-assemblies. In some of the disclosed and/or other embodiments, the vehicle frame can be configured to deform in the vicinity of the passenger area in a predetermined controlled manner so that the dimensions of the passenger area after loading can be substantially the same as the dimensions of the passenger area prior to the input load or kinetic energy.

It may therefore be beneficial to provide a vehicle with a frame assembly that addresses at least one of the above and/or other disadvantages or concerns of the related art. In particular, it may be beneficial to utilize a frame assembly that is sufficiently rigid to cope with load and/or energy inputs from the suspension as the vehicle travels over uneven terrain of an unimproved path, and that is sufficiently deformable in a predetermined controlled manner in response to load and/or energy inputs different from those input by the suspension. Further, it may be beneficial to utilize structures of the frame assembly and/or sub-assemblies mounted on the frame assembly that can reduce or avoid imparting damage to one or more systems, components and/or assemblies mounted on the deforming frame assembly and/or sub-assembly. For example, in one embodiment, a bumper mount bracket can be used to mount a bumper of a vehicle while also serving as a radiator mount. A single bracket can be used to mount both the bumper and radiator to the frame body. The bracket can be designed to have an open top allowing the bumper assembly to swing upward while the radiator moves up and rearwards and out of the way of the bumper assembly.

FIG. 1 is a perspective view of an exemplary vehicle 10 including a frame assembly 18 in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle frame assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
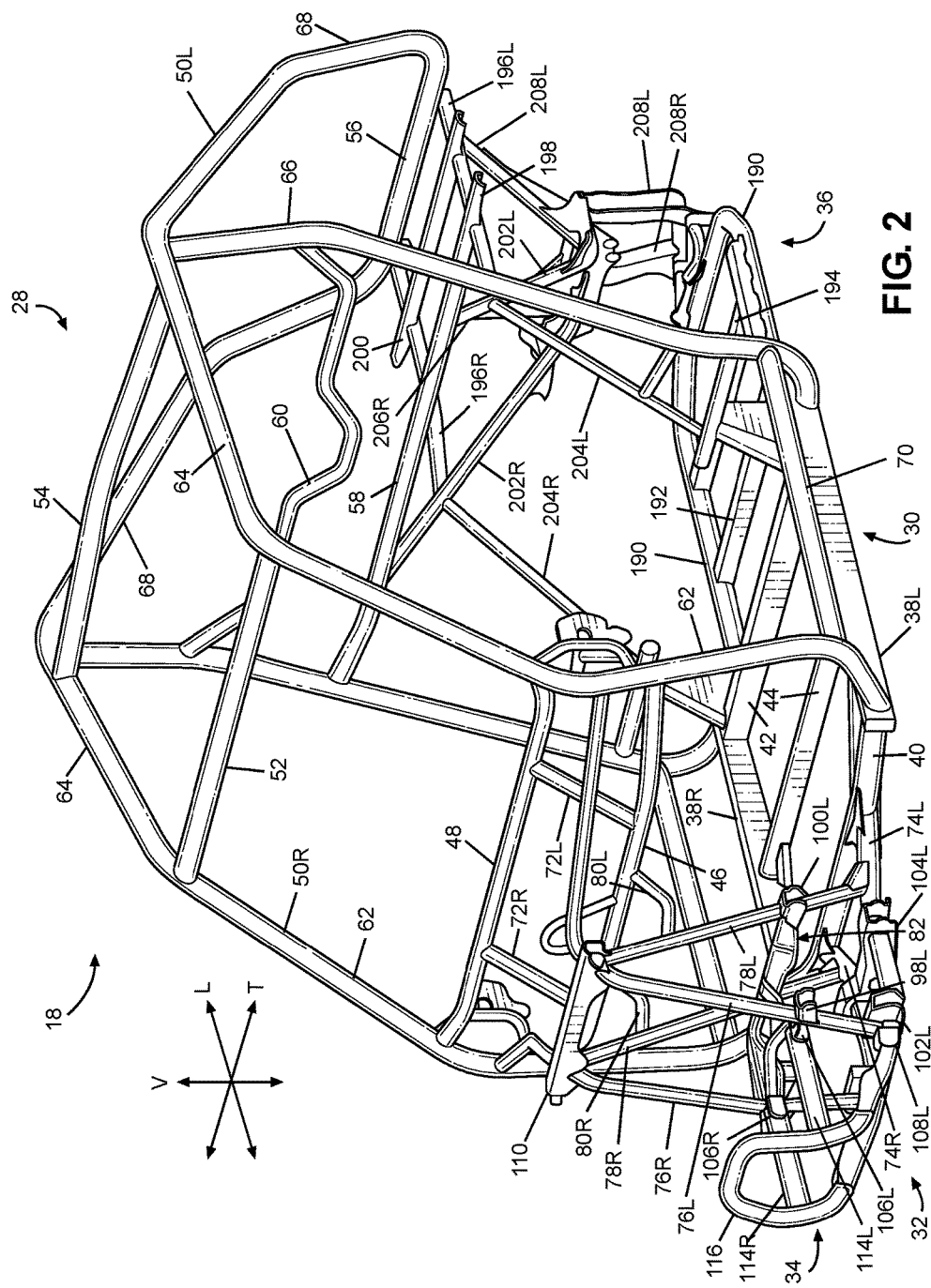
FIG. 2 is perspective view of a frame assembly of the vehicle of FIG. 1.

The vehicle 10 can include a body 12, a pair of front wheels, 14L, 14R, a pair of rear wheels 16L, 16R, a frame assembly 18, a pair of door assemblies 20L, 20R, and a powertrain. Portions of the frame assembly 18 are hidden from view in FIG. 1 by the body 12 (but are shown in FIG. 2), and the powertrain is omitted from FIG. 1 for simplicity and clarity of the drawing.

The vehicle 10 can include a pair of front seats 22L, 22R mounted in a passenger area of the vehicle 10. The frame assembly 18 can include a roll cage 28 configured to extend around and above the seats 22L, 22R and the passenger area. The roll cage 28 can cooperate with the body 12 and/or at least a portion of the frame assembly 18 to define a pair of door openings through which a passenger may pass in order to enter or exit the passenger area.

The door assemblies 20L, 20R, which occupy the door openings, each can include a door 24 and a window panel assembly 26, and can be configured to selectively open and close access through the door openings by moving between a closed position and a fully opened position. (The door 24 of the right-side door assembly 20R is obscured from view in FIG. 1). In the closed position, the door assemblies 20L, 20R, can span the respective door openings to obstruct access to the passenger area via the door openings. In the closed position, the front portion of each door assembly 20L, 20R can be latched to the roll cage 28. The fully opened position can be any position where the door assemblies 20L, 20R are pivoted away from the respective door openings to provide substantially unobstructed access to the passenger area via the door openings. FIG. 1 shows the door assemblies 20L, 20R in the closed position.

The powertrain can include an internal combustion engine, one or more electric motor(s) or a hybrid of an internal combustion engine and one or more electric motor (s), a hydrogen engine, or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14 and selectively drive the rear wheels 16L, 16R. In the exemplary embodiment of FIG. 1, the powertrain is configured as a longitudinally oriented, rear-mounted internal combustion engine that drives the rear wheels 16L, 16R and selectively drives the front wheels 14L, 14R.

II. Frame Assembly

FIG. 2 is a perspective view of the frame assembly 18. The frame assembly 18 can be configured to support the body 12, door assemblies 20L, 20R, seats 22L, 22R, suspension components for the wheels 14L, 14R, 16L, 16R, powertrain, steering system, control pedal assemblies, passengers and cargo items. The frame assembly 18 can be configured to withstand various modes of operation, including operation on unimproved paths. As will be discussed in greater detail below, the frame assembly 18 can be configured to surround the passenger area.

The frame assembly 18 can include a main frame assembly 30, a front frame assembly 32, a front bumper assembly 34 and a rear frame assembly 36. As will be discussed in greater detail below, a load and energy management apparatus can distribute loads input by the front suspension on one side of the front frame assembly 32 to the other side of the front frame assembly 32. Further, the load and energy management system can distribute and attenuate loads and energy throughout the front frame assembly 32 that are applied to the front bumper assembly 34 to thereby manage the energy so that any deflection of the frame assembly 18 in the vicinity of the passenger area can be controlled in an advantageous predetermined manner.

The main frame assembly 30 can define the passenger area of the vehicle 10. The main frame assembly 30 can be configured to provide an overall bending stiffness and torsional stiffness of the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/systems, such as but not limited to portions of the body 12, a front final drive assembly, steering system components, engine cooling system, headlights, etc.

The front bumper assembly 34 can be connected to the front end of the front frame assembly 32, such that the front frame assembly 32 is located between the front bumper assembly 34 and the main frame assembly 30. The front bumper assembly 34 can extend beyond the exterior of the body 12, or alternatively, one or more portions of the body 12 can conceal the front bumper assembly 34.

The main frame assembly 30, front frame assembly 32, front bumper assembly 34 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

A. Main Frame Assembly

The main frame assembly 30 can define the passenger area and can include the roll cage 28, a pair of longitudinal members 38L, 38R and a plurality of lower cross members 40, 42, 44, a pair of upper cross members 46, 48, and a pair of support members 72L, 72R.

The longitudinal members 38L, 38R can extend in the longitudinal direction L of the vehicle 10, from the front of the passenger area to the rear of the passenger area. The longitudinal members 38L, 38R can each be configured as a substantially straight, hollow beam having a substantially rectangular cross-sectional shape.

The first through third lower cross members 40, 42, 44 can extend in the transverse direction T of the vehicle 10, from the left longitudinal member 38L to the right longitudinal member 38R. The first lower cross member 40 can be slightly bent along the longitudinal direction L near each end toward the rear of the vehicle 10. The first lower cross member 40 can be a hollow tube having a substantially circular cross-sectional shape. The second and third lower cross members 42, 44 can be configured as a substantially straight, hollow beam having a substantially rectangular cross-sectional shape.

The first lower cross member 40 can be connected to each of the longitudinal members 38L, 38R adjacent a respective front end of the longitudinal members 38L, 38R. The second lower cross member 42 can be connected to each of the longitudinal members 38L, 38R adjacent a respective rear end of the longitudinal members 38L, 38R. The third lower cross member 44 can be connected to each of the longitudinal members 38L, 38R at a portion of the longitudinal members 38L, 38R intermediate the front and rear ends of the respective longitudinal members 38L, 38R. In the exemplary embodiment of FIG. 2, welds can connect the lower cross members 40, 42, 44 to the longitudinal members 38L, 38R.

The first and second upper cross members 46, 48 can extend in the transverse direction T of the vehicle 10 from the left cage side assembly 50L to the right cage side assembly 50R. The first upper cross member 46 can be spaced away from the second upper cross member 48. The second upper cross member 48 can be connected to the cage side assemblies 50L, 50R at a position that is higher in the vertical direction V of the vehicle 10 than the position at which the first upper cross member 46 is connected to the side assemblies 50L, 50R.

The support members 72L, 72R can extend generally in the vertical direction V of the vehicle 10 from the first upper cross member 46 to the second upper cross member 48. The support member 72L, 72R can be spaced apart from each other in the transverse direction T of the vehicle 10. The support members 72L, 72R can each be configured as a hollow tube having a substantially circular cross-sectional shape. In the exemplary embodiment of FIG. 2, welds can connect the support members 72L, 72R to the upper cross members 46, 48.

The upper cross members 46, 48 and the support members 72L, 72R can be configured to support and secure a panel assembly (such as but not limited to an instrument panel assembly), a steering assembly, and/or a portion of the body 12 (such as but not limited to a hood panel 13—see FIG. 1).

The roll cage 28 can include a pair of cage side assemblies 50L, 50R, a plurality of cage cross members 52, 54, 56, 58, 60. The roll cage 28 generally defines the passenger compartment.

The cage side assemblies 50L, 50R can extend in the longitudinal direction L of the vehicle 10, from the front end of the passenger area to the rear end of the passenger area. The cage side assemblies 50L, 50R can define the limits of the passenger area in the transverse direction T of the vehicle 10, the longitudinal direction L of the vehicle 10 and in the vertical direction V of the vehicle 10. The cage side assemblies 50L, 50R can be configured to support the door assemblies 20L, 20R and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc. The cage side assemblies 50L, 50R can be configured to resist, impede, or minimize deformation that could be caused by a load or kinetic energy input into either or both of the cage side assemblies.

Each of the cage side assemblies 50L, 50R can be formed from any appropriate number of structural elements, from one to any number greater than one. The side cage assemblies 50L, 50R can be configured with any shape and contour that can be advantageous to meet the structural performance and aesthetic appeal desired for the vehicle 10. The following description will be directed toward the left cage side assembly 50L with the understanding that the right cage side assembly 50R can be a mirror image of the left cage side assembly 50L.

The left cage side assembly 50L can include a plurality of cage side members 62, 64, 66, 68, 70. Each of the first through fifth cage side members 62, 64, 66, 68, 70 can be configured as a hollow tube having a substantially circular cross-section shape. The cage side members 62, 64, 66, 68, 70 can be configured with any appropriate elongated shape that can provide the desired dimensionality of the passenger area and advantageously conform to the aesthetic appearance desired for the vehicle 10.

The first cage side member 62 can be referred to as an A-pillar. The first cage side member 62 can be connected at one end to the left longitudinal member 38L adjacent the front end of the left longitudinal member 38L. The first cage side member 62 can be connected to a side of the left longitudinal member 38L that can be opposite to the side to which the first cross member 40 is connected. The one end of the first cage side member 62 can be aligned in the transverse direction T with the end of the first cross member 40 that is connected to the left longitudinal member 38L.

Each of the upper cross members 46, 48 can be connected to a middle portion of the first cage side member 62 of each of the cage side assemblies 50L, 50R.

The third cage side member 66 can be referred to as a B-pillar. The third cage side member 66 can be connected at one end to the left longitudinal member 38L adjacent the rear end of the left longitudinal member 38L. The third cage side member 66 can be connected to a side of the left longitudinal member 38L that can be opposite to the side to which the second lower cross member 42 is connected. The one end of the third cage side member 66 can be aligned in the transverse direction T with the end of the second cross member 42 that is connected to the left longitudinal member 38L.

The first through fifth cage cross members 52, 54, 56, 58, 60 can extend in the transverse direction T of the vehicle 10 from the left side assembly 50L to the right side assembly 50R. The cage cross members 52, 54, 56, 58, 60 can be connected to each of the side assemblies 50L, 50R at respective locations spaced apart along the longitudinal direction L of the vehicle 10. The cage cross members 52, 54, 56, 58, 60 can be configured to maintain a predetermined spacing between the left cage side assembly 50L and the right cage side assembly 50R in the transverse direction T. The cage cross members 52, 54, 56, 58, 60 can define the limits of the passenger area in the longitudinal direction L of the vehicle 10 and the vertical direction V of the vehicle 10. The cage cross members 52, 54, 56, 58, 60 can be configured to manage load and/or energy inputs so that deflection of the frame assembly 18 in the vicinity of the passenger area can be controlled in an advantageous predetermined manner. In the exemplary embodiment of FIG. 2, the cage cross members 52, 54, 56, 58, 60 can be connected to the cage side assemblies 50L, 50R by welding.

B. Front Frame Assembly

Referring to FIG. 2, the front frame assembly 32 can be connected to the first lower cross member 40 and each of the first cage side members 62 of the main frame assembly 30. The front frame assembly 32 can include the front bumper assembly 34, a pair of front lower members 74L, 74R, a pair of first front members 76L, 76R, a pair of second front members 78L, 78R, a pair of intermediate members 80L, 80R and a transverse frame assembly 82.

The front frame members 76L, 76R, 78L, 78R can be spaced apart from each other in the transverse direction T of the vehicle 10 by a predetermined distance sufficient to accommodate any component(s) and/or system(s) to be supported by the front frame assembly 32. Referring to FIGS. 3, 4, 10, 11 and 13-15, the front frame assembly 32 can be configured to support a front suspension and wheel assembly, a radiator assembly 84, a steering rack assembly 86 and a front final drive assembly 88. The front suspension and wheel assembly can include suspension members 90L, 90R, 92L, 92R, damper and spring assemblies 94L, 94R, front hub assemblies 96L, 96R and the front wheels 14L, 14R.

The front frame assembly 32 can include a plurality of mounting brackets 98L, 98R, 100L, 100R, 102L, 102R, 104L 104R, 106L, 106R, 108L, 108R that connect the front suspension and wheel assembly, the radiator assembly 84, and the front bumper assembly 34 to the front frame assembly 32. The front suspension and wheel assembly can be movably connected to each of the suspension brackets 98L, 98R, 100L, 100R, 102L, 102R, 104L, 104R so that the suspension members 90L, 90R, 92L, 92R pivot relative to the suspension brackets 98L, 98R, 100L, 100R, 102L, 102R, 104L, 104R and the front wheels 14L, 14R move generally in the vertical direction V of the vehicle 10 as the vehicles travels along an improved or unimproved pathway. The front bumper assembly 34 can be connected to each of the bumper brackets 106L, 106R, 108L, 108R. The following description will be directed toward the brackets 98L, 100L, 102L, 104L, 106L, and 108L mounted on left side of front frame assembly 32 with the understanding that the brackets 98R, 100R, 102R, 104R, 106R, 108R mounted on the right side of the front frame assembly 32 can be a mirror image of the brackets 98L, 100L, 102L, 104L, 106L, 108L on the left side of the front frame assembly 32, and each can be connected to the right and left side of the front frame assembly 32, respectively, in similar manners.

Figure 3:
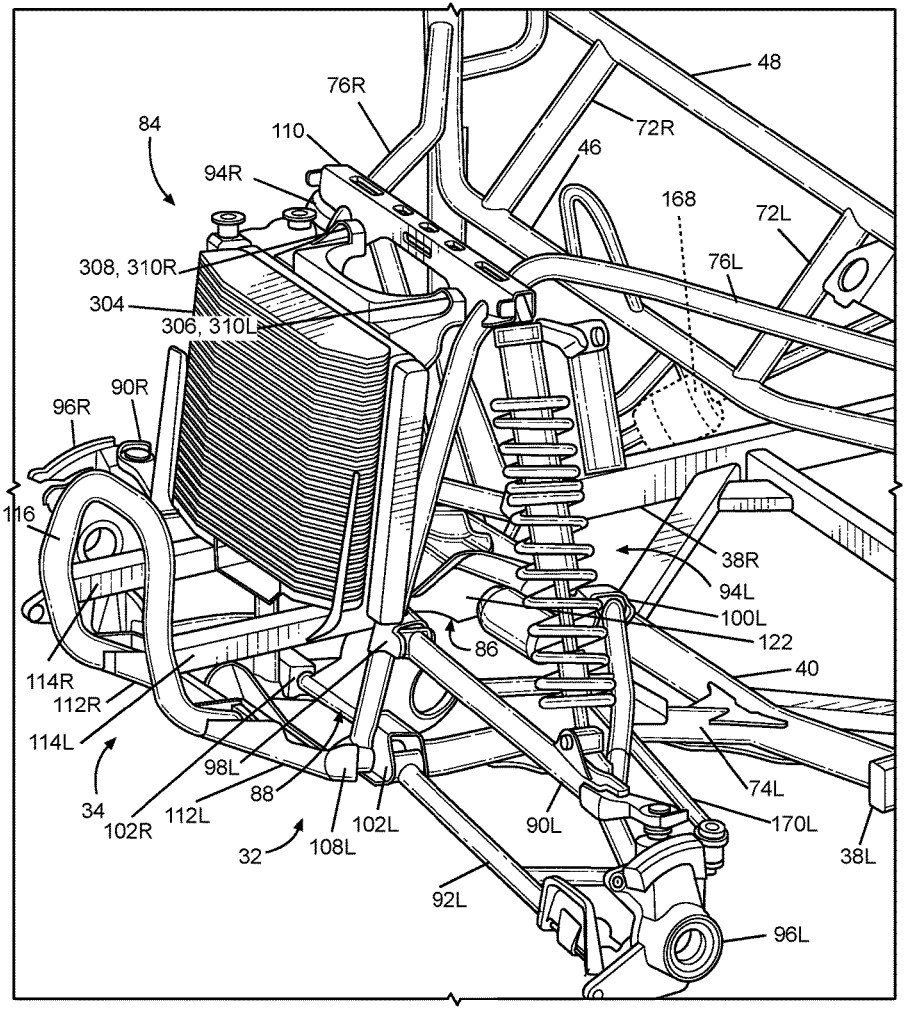
FIG. 3 is a partial perspective view of the frame assembly of FIG. 2 and attached components of the vehicle of FIG. 1.

Referring to FIGS. 2, 3 and 6-8, the left side of the front frame assembly 32 can include a pair of upper suspension brackets 98L, 100L, a pair of lower suspension brackets 102L, 104L. Referring to FIG. 3, the upper suspension member 90L can be connected to each of the upper suspension brackets 98L, 100L. The lower suspension member 92L can be mounted to the lower suspension brackets 102L, 104L in any appropriate manner such as but not limited to threaded fasteners, and with or without rubber bushings. As will be discussed in further detail below, the front bumper assembly 34 can be mounted to the upper bumper bracket 106L and the lower bumper bracket 108L in various manners.

The front frame assembly 32 can include an upper bracket 110. The upper bracket 110 can be connected to and extend from each of the first frame members 76L, 76R. The upper bracket 110 can extend in the transverse direction T of the vehicle 10 to span from the left first frame member 76L to the right first frame member 76L.

Referring to FIG. 3, an upper end of each of the spring and damper assemblies 94L, 94R can be connected to a respective end of the upper bracket 110 in an appropriate manner such as but not limited to threaded fasteners.

Figure 7:
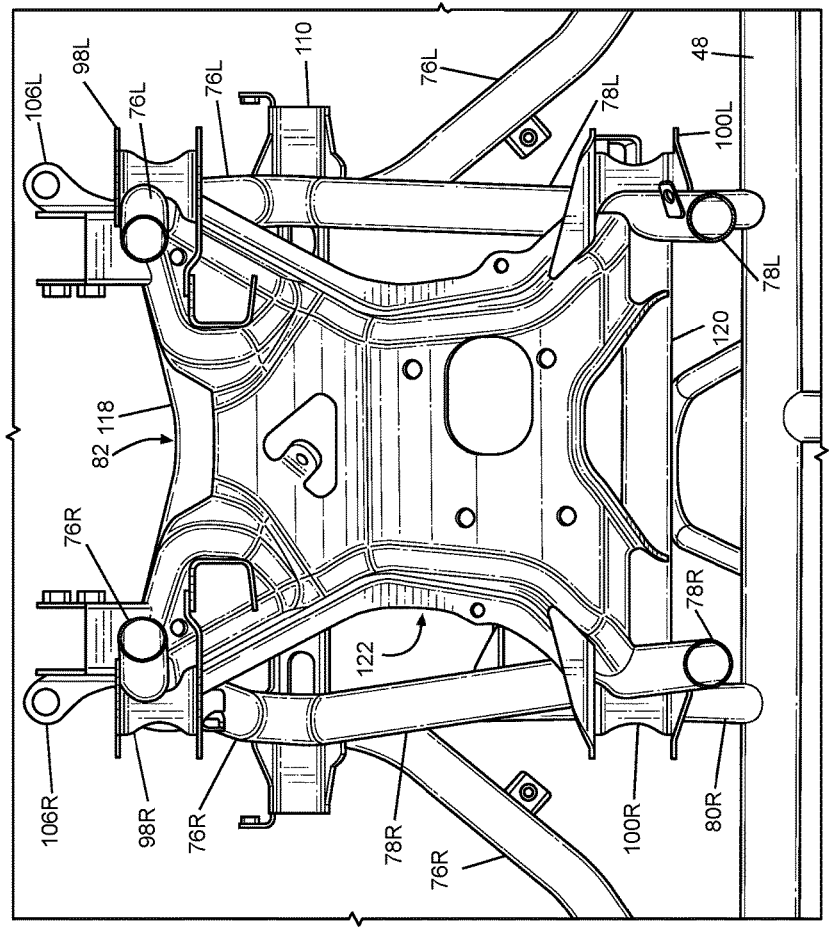
FIG. 7 is a plan view of the bottom of a front portion of the frame assembly of FIG. 2.

In the exemplary embodiment of FIG. 7, each of the front lower frame members 74L, 74R, the first front frame members 76L, 76R, the second front frame members 78L, 78R is configured as hollow metal tubes having a substantially circular cross-section. However, any combination of the front lower frame members 74L, 74R, the first front frame members 76L, 76R and the second front frame members 78L, 78R can have a cross-sectional shape that is different from a substantially circular cross-sectional shape. Further, any combination of the front lower frame members 74L, 74R, the first front frame members 76L, 76R and the second front frame members 78L, 78R can be formed of a material other than metal, such as but not limited to carbon fiber, plastic, carbon fiber reinforced plastic, ceramic, pulp, or glass fiber reinforced plastic.

Further, the front lower frame members 74L, 74R, the first front frame members 76L, 76R, the second front frame members 78L, 78R can be welded to each other to form the structure described above. However, embodiments are intended to include or otherwise cover any combination of the front lower frame members 74L, 74R, the first front frame members 76L, 76R and the second front frame members 78L, 78R connected by threaded fasteners, adhesives, a combination of brackets and threaded fasteners, rivets, or other known connective structures, materials, or methods.

As will be discussed in greater detail below, the upper bumper brackets 106L, 106R can be configured to support and engage the radiator assembly 84. Each of the upper bumper brackets 106L, 106R can be mounted on a respective one of the first front frame members 76L, 76R. Each of the lower bumper brackets 108L, 108R can also be mounted on a respective one of the first front frame members 76L, 76R. Further details of the upper bumper brackets 106L, 106R are discussed below.

C. Transverse Frame Assembly

The transverse frame assembly 82 can extend in the longitudinal direction L, the transverse direction T and the vertical direction V. Referring to FIGS. 2, 6, 7 and 10, the transverse frame assembly 82 can be connected to and extend from each of the first and second frame members 76L, 76R, 78L, 78R.

Figure 6:
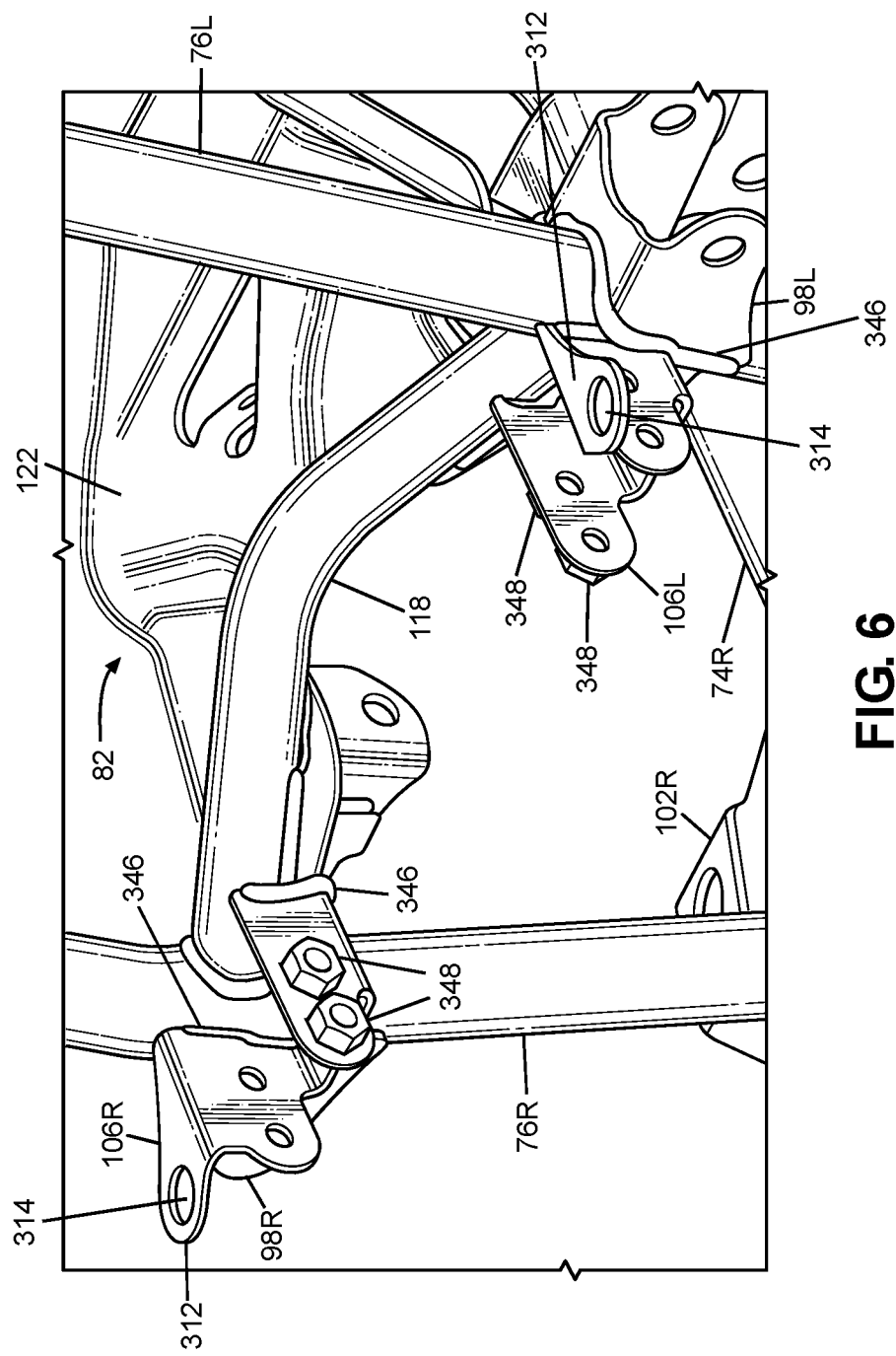
FIG. 6 is a perspective view of an enlarged portion of the frame assembly of FIG. 2 showing the bumper brackets mounted on the frame assembly of FIG. 2.
Figure 10:
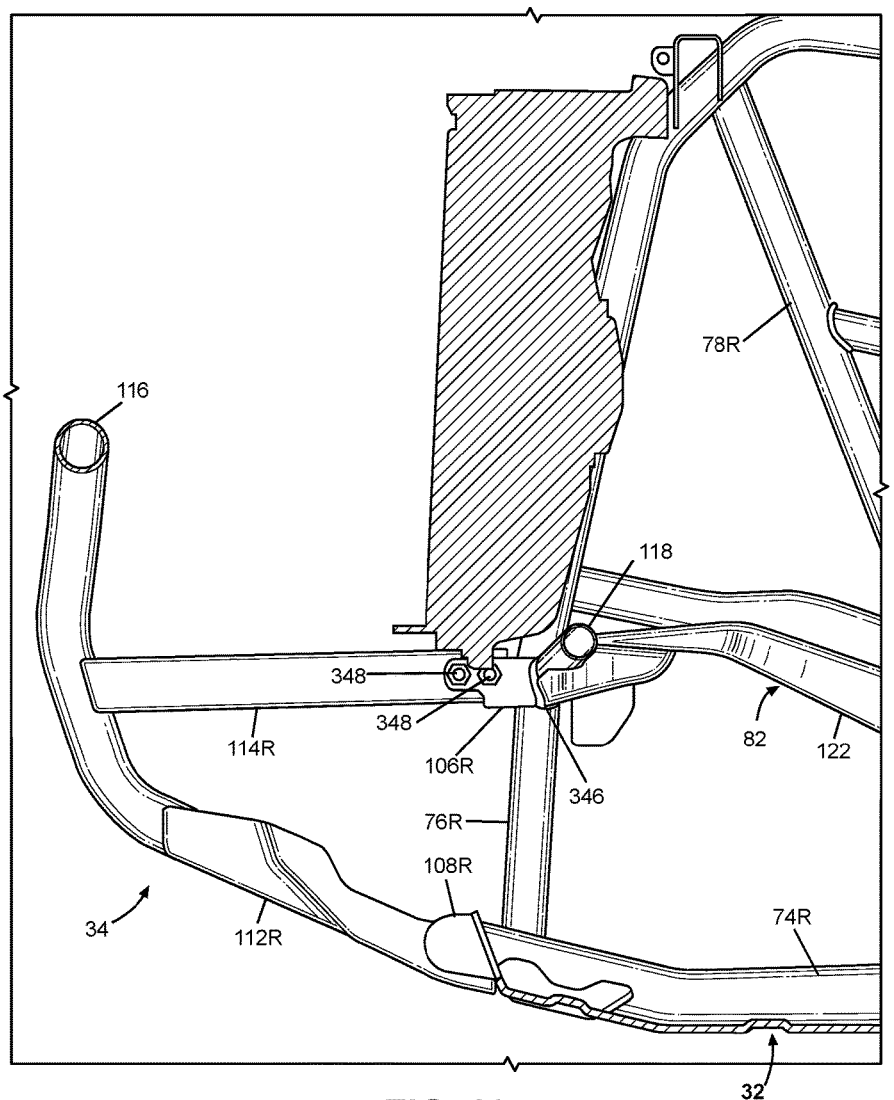
FIG. 10 is a cross-sectional view of a front portion of the vehicle. The front suspension and wheel assembly is removed for clarity and simplicity of the drawing.

Referring to FIGS. 6, 7 and 10, the transverse frame assembly 82 can include a first front cross member 118, a second front cross member 120, and a plate 122. Each of the front cross member 118, the second front cross member 120, and the plate 122 can also be referred to as a transverse frame member. Further, the transverse frame assembly 82 can be referred to as a transverse frame member.

The first front cross member 118 can be connected to and extend from each of the first frame members 76L, 76R. The first front cross member 118 can extend in the transverse direction T of the vehicle 10. Referring to FIGS. 6 and 7, the first front cross member 118 can be connected to each of the first frame members 76L, 76R at a location that is generally opposed to the location at which the first upper suspension brackets 98L, 98R are connected to the first frame members 76L, 76R. For example, the first front cross member 118 can be connected to an area of the first frame members 76L, 76R that opposes at least a portion of an area on the first frame members 76L, 76R to which the first upper suspension brackets 98L, 98R are mounted. The first front cross member 118 can be curved or bent at a central portion such that the first front cross member 118 is arched upwardly in the vertical direction V of the vehicle 10, and the arch extends away from the lower front lower frame members 74L, 74R.

Referring to FIG. 7, the second front cross member 120 can be connected to and can extend from each of the second frame members 78L, 78R. The second front cross member 120 can extend in the transverse direction T of the vehicle 10. The second front cross member 120 can be connected to each of second frame members 78L, 78R at a location that generally opposes the location at which the second upper suspension brackets 100L, 100R are connected to the second frame members 78L, 78R. More specifically, the second front cross member 120 can be connected at an area of the of the second frame members 78L, 76R that at least opposes the area on the second frame members 78L, 76R to which the second upper suspension brackets 100L, 100R are mounted. The second front cross member 120 can be a substantially straight member that extends in the transverse direction T of the vehicle 10.

In the exemplary embodiment of FIGS. 6, 7 and 10, each of the front cross members 118, 120 is configured as a hollow metal tube having a substantially circular cross-section that can be welded to each of the first frame members 76L, 76R and the plate 122. However, exemplary embodiments are intended to include or otherwise cover either one or both of the front cross members 118, 120 being formed of a material other than metal, such as but not limited to carbon fiber, plastic, carbon fiber reinforced plastic, ceramic, pulp, glass fiber reinforced plastic, or other known structural material. Further, exemplary embodiments are intended to include or otherwise cover any one or both of the front cross members 118, 120 connected to the respective ones of the first and second frame members 76L, 76R, 78L, 78R in other ways such as but not limited to threaded fasteners, adhesives, welds, a combination of brackets and threaded fasteners, or rivets.

Referring to FIGS. 6 and 7, the plate 122 can be stamped from a flat metal sheet. The plate 122 can extend in the traverse direction T of the vehicle 10 and be connected to each of the front cross members 118, 120. The plate 122 can be connected directly, or indirectly via the front cross members 118, 120, to each of the first and second front frame members 76L 76R, 78L, 78R. The plate 122 can extend in the transverse direction T and the longitudinal direction of the vehicle 10 from each of the first and second frame members 76L, 76R, 78L, 78R.

Figure 5:
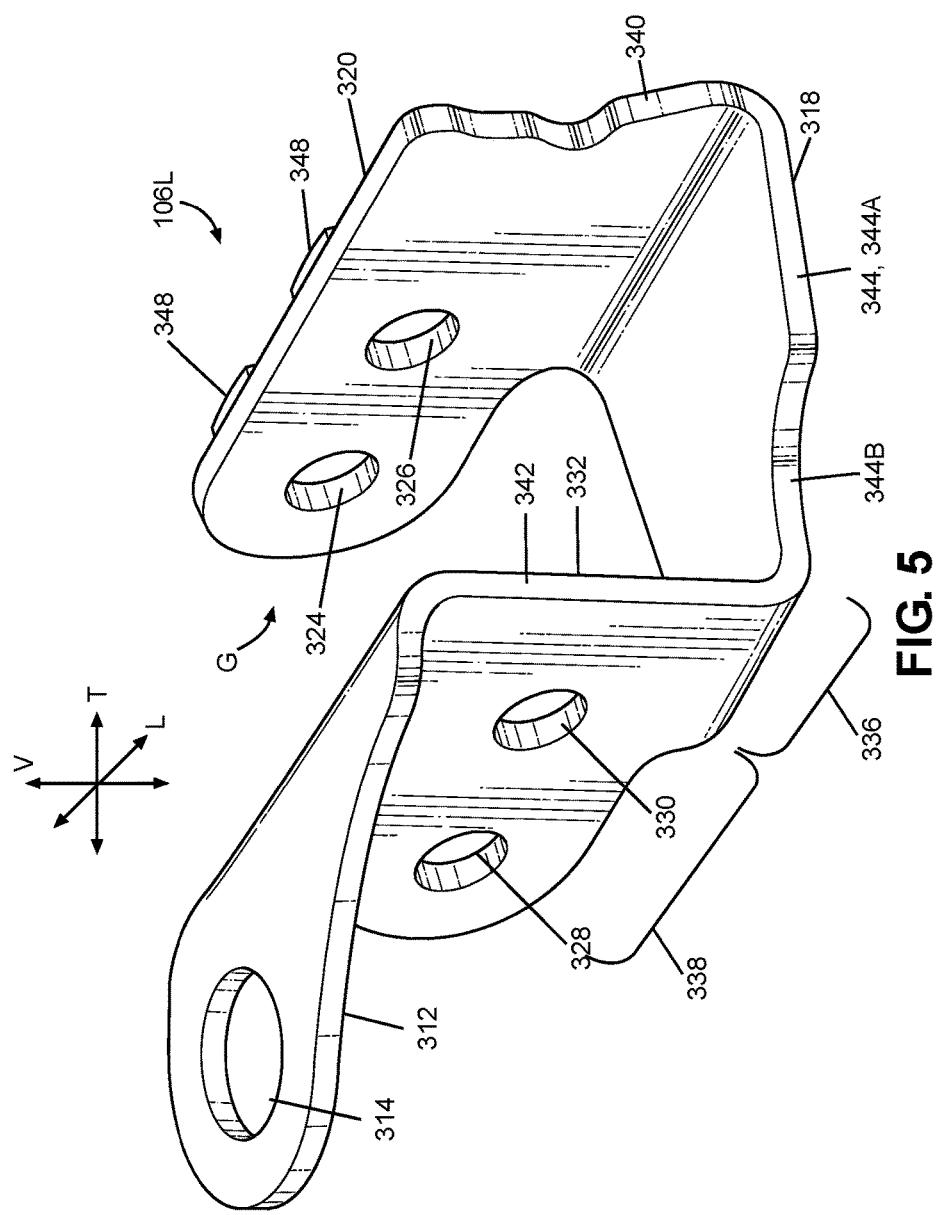
FIG. 5 is a rear perspective view of the upper bumper bracket of FIG. 4.

In the exemplary embodiment of FIG. 5, the plate 122 is configured as a three-dimensional, homogenously integrated, stamped metal component that can be welded to each of frame members 76L, 76R, 78L, 78R, 118, 120. However, exemplary embodiments are intended to include or otherwise cover a plate 122 formed of a material other than metal, such as but not limited to carbon fiber, plastic, carbon fiber reinforced plastic, ceramic, pulp, glass fiber reinforced plastic, or other known structural material. Further, exemplary embodiments can include or otherwise cover a plate 122 connected to respective ones of the frame members 76L, 76R, 78L, 78R, 118, 120 in other ways such as but not limited to threaded fasteners, adhesives, a combination of brackets and threaded fasteners, welds, rivets, or other structures/materials. Further still, exemplary embodiments are intended to include or otherwise cover a plate 122 assembled from a plurality of separate pieces.

D. Front Bumper Assembly

The front frame assembly 32 can include the front bumper assembly 34. Referring to FIGS. 2 and 3, the front bumper assembly 34 can be connected to the front side of the first frame members 76L, 76R, such that the first and second frame members 76L, 76R, 78L, 78R are located between or intermediate the front bumper assembly 34 and the main frame assembly 30.

Referring to FIGS. 2, 3, 9 and 10, the front bumper assembly 34 can include a pair of lower connector members 112L, 112R, a pair of upper connector members 114L, 114R and a bumper member 116. Each of the connector members 112L, 1124R, 114L, 114R can extend in the longitudinal direction L of the vehicle 10. The bumper member 116 can be a separate structure connected to each of the connector members 112L, 112R, 114L, 114R, or all can be integrated together into a single structure. The bumper member 116 can extend in the transverse direction T of the vehicle 10 to span from the left upper connector member 114L to the right upper connector member 114R.

A first end of each of the lower connector members 112L, 112R can be connected to a respective one of the lower bumper brackets 108L, 108R. Lower connector members 112L, 112R can be connected to the respective one of the bumper brackets such that the lower bumper brackets 108L, 108R can pivot with respect to the lower bumper brackets. The second end of the lower connector members 112L, 112R can be connected to the bumper member 116.

A first end of the upper connector members 114L, 114R can be connected to a respective one of the upper bumper brackets 106L, 106R. The second end of the upper connector members 114L, 114R can be connected to the bumper member 116.

The upper connector members 114L, 114R can be configured to deform in a predetermined and controlled manner in response to load or kinetic energy input to the bumper member 116 that exceeds a predetermined threshold. For example, the upper connector members 114L, 114R can be configured to collapse along the length of the upper connector members 114L, 114R. That is, the upper connector members 114L, 114R can be formed from any material and/or with any structure that can promote the desired deformation. By way of example only, FIGS. 2, 3 and 8-12, show the upper connector members 114L, 114R as elongate members having a rectangular cross-sectional shape. Further, by way of example only, the upper connector members 114L, 114R can include one or more holes, cutouts, corrugated regions, bends, any combination thereof, etc., that can permit the upper connector members 114L, 114R to deform in a predetermined and controlled manner during an impact event.

The lower connector members 112L, 112R can pivot relative to the lower bumper brackets 108l, 108R as the upper connector members 114L, 114R collapse. However, exemplary embodiments are intended to include any appropriate connection that can achieve the desired performance of the bumper assembly 34 in response to a load and/or energy that exceeds a predetermined threshold. The predetermined threshold can be set at a value where only the front bumper assembly 34 is subjected to deformation by the load or kinetic energy input to the bumper member 116, without deformation to the front frame assembly 32 or the main frame member 30.

The bumper member 116 can be configured with any appropriate shape and dimensions that can achieve the desired performance of the front bumper assembly 34 in response to the load or kinetic energy input.

E. Radiator Assembly

Figure 8:
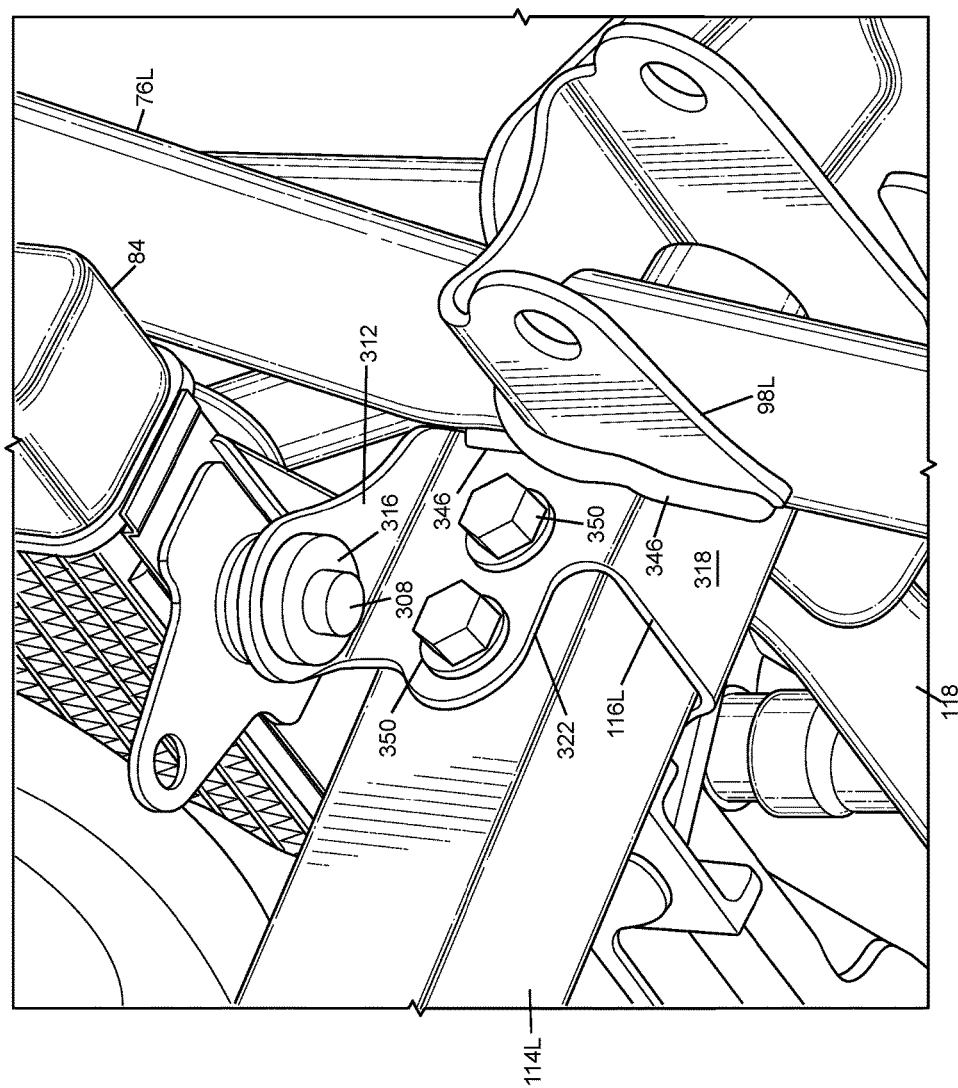
FIG. 8 is a bottom perspective view of an enlarged portion of FIG. 3 showing the radiator assembly and the front bumper assembly connected to the upper bumper bracket of FIG. 4. The front suspension and wheel assembly is removed for clarity and simplicity of the drawing.
Figure 11:
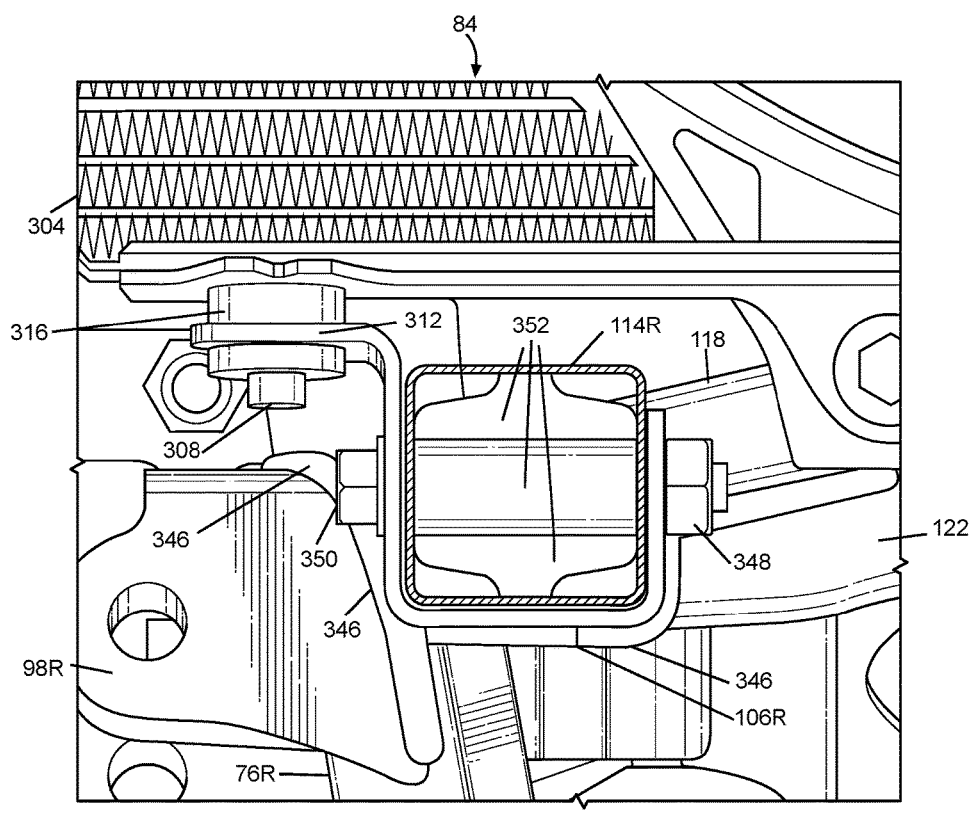
FIG. 11 is front view of an enlarged portion of the vehicle of FIG. 3. An exemplary upper connector member of the bumper assembly is shown in cross-section. The front suspension and wheel assembly is removed for clarity and simplicity of the drawing.

Referring to FIGS. 3, 8 and 11 collectively, the radiator assembly 84 can include a radiator 304, a radiator bracket 306 and a pair posts 308L, 308R. The radiator 304 can be configured for engine coolant to flow through the radiator 304 and ambient air to flow over the radiator 304 such that heat from the engine coolant can be transferred to the ambient air. The upper end of the radiator 304 can be connected to the radiator bracket 306 in any appropriate manner such as but not limited to mechanical fasteners, adhesives, welding, etc. The radiator bracket 306 can be connected to the upper bracket 110 in any appropriate manner such as but not limited to mechanical fasteners, adhesives, welding, etc.

In the exemplary embodiment of FIG. 3, the upper bracket 110 can include a pair of mounting holes (obscured from view by the radiator bracket 306) spaced apart in the transverse direction T of the vehicle 10, and the radiator bracket 306 can include a pair of projections 310L, 310R. Each of the projections 310L, 310R can include a mounting hole (obscured from view by the projections 310L, 310R) that is aligned with a respective one of the mounting holes in the upper bracket 110. A bolt and nut assembly (obscured from view by the projections 310L, 310R) can pass through the aligned mounting holes and tightened to secure the radiator bracket 306, and thus, the radiator 304 to the front frame assembly 32. However, the projections 310L, 310R can be connected to the upper bracket 110 of the front frame assembly in any appropriate manner such as but not limited to mechanical fastener(s), welding, adhesive, or any combination thereof. The radiator bracket 306 can be mounted on an upper portion of the radiator 304 in an appropriate manner such as but not limited to mechanical fastener(s), welding, adhesive, or any combination thereof.

Referring to FIGS. 8 and 11, the posts 308 can be a mating structure of the radiator assembly 84 that is configured to engage a respective one of the upper bumper brackets 106L, 106R. Further details of the interaction between the posts 308 and the upper bumper brackets 106L, 106R will be discussed below.

Although the exemplary radiator bracket 306 of the embodiment of FIG. 3 includes a pair of mounting portions 310L, 310R symmetrically arranged on the radiator bracket 306, embodiments can include any appropriate structural configuration of the radiator bracket 306 that can mount the radiator 304 on the front frame assembly 32. For example, the radiator bracket 306 can be configured as a bracket that is substantially shorter in the transverse direction of the vehicle 10 as compared to radiator bracket 306 of FIG. 3, such that the bracket can be referred to as a narrow strap that extends from the center of the upper portion of the radiator 304 and is connected to the upper bracket 110 at a single location centered on the upper bracket 110. In another exemplary embodiment, the radiator bracket can include only one of the mounting portions 310L, 310R, symmetrically or asymmetrically arranged on the radiator bracket. In yet another exemplary embodiment, the radiator bracket can include only three or more mounting portions symmetrically or asymmetrically arranged on the radiator bracket.

F. Mounting Assembly

The vehicle 10 can include one or more systems, components and/or assemblies, such as but not limited to the radiator assembly 84, the steering rack assembly 86, the front final drive assembly 88, headlights, marker lights, flood lights, electrical wiring assemblies, and electronic control modules may be mounted on the front frame assembly 32. Any one of these exemplary systems may be subjected to an impact with the bumper assembly 34 if the bumper assembly 34 deforms toward the passenger compartment of the vehicle 10 due to a load or kinetic energy applied to the front bumper assembly 34 along the longitudinal direction L of the vehicle 10. The vehicle 10 can include a mounting assembly that can be configured to displace the exemplary system(s)/assembly(ies)/component(s) away from the deforming front bumper assembly 34 in an effort to reduce or avoid, if possible, impact with the deforming front bumper assembly 34.

FIG. 3 generally shows that the vehicle 10 can include an exemplary mounting assembly configured to connect each of the front bumper assembly 34 and the radiator assembly 84 to the vehicle 10. The mounting assembly can include at least one of the first front members 76L, 76R, at least one of the transverse frame members (also known as the transverse frame assembly 82, or the first cross frame member 118, or the plate 122), and at least one of the upper bumper brackets 106L, 106R.

Referring to FIGS. 2, 3 and 6-11, each of the upper bumper brackets 106L, 106R can be connected to a respective one of the upper connector members 114L, 114R of the bumper assembly 34, and can be connected to a respective one of the first front frame members 76L, 76R.

Figure 4:
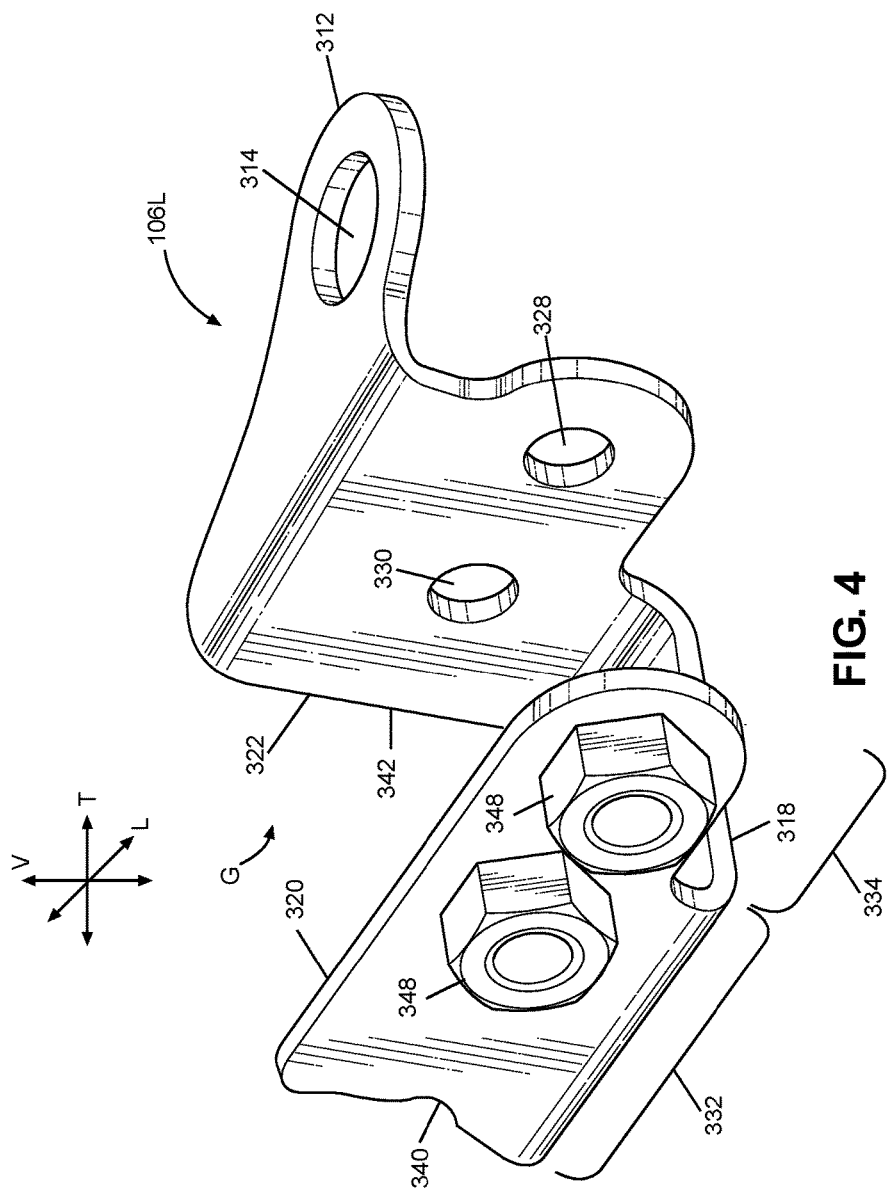
FIG. 4 is a front perspective view of an upper bumper bracket in accordance with the disclosed subject matter for supporting and mounting a radiator assembly and a bumper assembly of the vehicle of FIG. 1 on the frame assembly of FIG. 2.

The following discussion is directed to the left-side bumper bracket 106L with the understanding that the right-side upper bumper bracket 106R can be a mirror image of the left-side upper bumper bracket 106L. Referring to FIGS. 4 and 5, each of the bumper brackets 106L, 106R can include a flange 312. The flange 312 can extend in the transverse direction T of the vehicle 10 when connected to the vehicle frame assembly. As will be discussed in further detail below, the flange 312 can be configured to engage the radiator assembly 84 if the radiator assembly 84 is mounted on the vehicle 10.

As shown in FIGS. 4-7, the flange 312 can have an irregular shape. For example, the flange 312 can have a rounded forward end. The flange 312 can taper from the rounded forward end to a rearward end. The edge of the flange 312 that extends from the rounded forward end to the rearward end can be curved. This curved edge can be a simple, constant radius curve or a variable radius curve. However, exemplary embodiments are intended to include or otherwise cover any appropriate shape of the flange 312.

In the exemplary embodiments of FIGS. 2-12, the flange 312 can include a hole 314. The hole 314 can be located in the rounded forward end of the flange 312. The hole 314 can be configured to receive a respective one of the posts 308.

Referring to FIGS. 8 and 11, the mounting assembly can further include a pair of grommets 316. Each grommet 316 can pass through the hole 314 and can include a flange that extends along each of the upper surface and the lower surface of the flange 312 on either side of the hole 314. The grommet 316 can be made from an elastic material such as but not limited to natural rubber, synthetic rubber, or plastic. The grommet 316 can include a through hole that can be configured to tightly engage a respective one of the posts 308. The grommets 316 can be configured to dampen movement of the posts 308 as the vehicle 10 travels along terrain such that rattling noises and other undesirable noises can be reduced or dampened.

Each of the upper bumper brackets 106L, 106R can include a first portion mounted on each of the transverse frame member (82 or 118 or 122) and a respective one of the first frame members 76L, 76R. The first portion can include a bottom wall 318 and a pair of side walls 320, 322 that are connected to the bottom wall 318. The walls 318, 320, 322 can be arranged such that the first portion has a substantially U-shaped cross-section that is open toward the radiator assembly 84 when the flange 312 engages the radiator assembly 84. That is, the side walls 320, 322 can extend away from a bottom wall 318 in the same direction and be spaced apart from each other by the extent of the bottom wall 318 such that the end of the upper bumper bracket 106L that opposes the bottom wall 318 is opened.

The first and second side walls 320, 322 can be spaced apart from each other by a gap G. Comparing FIGS. 4-6 with FIGS. 8 and 9, the gap G can be configured to receive a respective one of the connector members 114L, 114R. That is, the gap G can be dimensioned to be complimentary to the dimension of each of the connector members 114L, 114R in the transverse direction T of the vehicle 10. The side walls 320, 322 can be substantially parallel to each other such that the first side wall 320 and the second side wall 322 are exactly parallel or such that the bottom wall 318 and the flange 312 can be described as substantially parallel to each other.

Referring back to FIGS. 4 and 5, the flange 312 can be cantilevered to the second side wall 322 and can extend away from the gap G in the transverse direction T of the vehicle 10. The flange 312 can be substantially parallel to the bottom wall 318 such that the flange 312 and the bottom are exactly parallel, or such that the bottom wall 318 and the flange 312 can be reasonably described as being parallel to each other. The mating structure (e.g., the posts 308) of the radiator assembly 84 is supported on the upper bumper brackets 106L, 106R at a location that is spaced away of the gap G such that the radiator assembly 84 can span the gap G of each of the upper bumper brackets 106L, 106R. Further, the opened end of each of the upper bumper brackets 106L, 106R faces toward the radiator assembly 84. That is, in the exemplary embodiment of FIGS. 1-11, the upper bumper brackets 106L, 106R are opened upwardly along the vertical direction V of the vehicle 10.

When the upper bumper brackets 106L, 106R connect the connector members 114L, 114R to the first frame members 76L, 76R and the transverse frame member (82 or 118 or 122), the opened end of each of the upper bumper brackets 106L, 106R can be opened toward the radiator assembly 84 in the vertical direction V of the vehicle 10. The connector member 114L can be displaced along the vertical direction V of the vehicle 10 and rearwardly along the longitudinal direction L of the vehicle 10 if a load or kinetic energy is applied to the connector member 114L along the longitudinal direction L of the vehicle 10 that exceeds a predetermined threshold value. The opened end of the upper bumper brackets 106L, 106R can permit the connector member 114L, 114R to move/deform out of the opened end of each of the upper bumper brackets 106L, 106R. This movement/displacement can cause the connector member 114L, 114R to abut the bottom of the radiator assembly 84. The posts 308 do permit movement of the radiator assembly 84 along the vertical direction V of the vehicle 10. Thus, the displacement/movement of the connector members 114L, 114R can displace the radiator assembly 84 away from the bumper assembly 34 when the bumper assembly 34 is deformed by a load or kinetic energy applied along the longitudinal direction L of the vehicle 10.

Each connector member 114L, 114R can be connected to a respective one of the upper bumper brackets 106L, 106R. In the exemplary embodiment of FIGS. 2-12, threaded mechanical fasteners can be used to connect the connector members 114L, 114R to the upper bumper brackets 106L, 106R. The first side wall 320 can include a pair of mounting holes 324, 326 spaced apart in the longitudinal direction L of the vehicle 10. The second side wall 322 can include a pair of mounting holes 328, 330 spaced apart in the longitudinal direction L of the vehicle 10. Each mounting hole 324, 326 of the first side wall 320 can be aligned with a respective one of the mounting holes 328, 330 of the second side wall 322. A threaded fastener can extend through each aligned pair of the mounting holes 324, 326, 328, 330.

Referring to FIG. 4, the first side wall 320 can includes a first portion 332 and a second portion 334. The first portion 332 can be continuous with the bottom wall 318. The second portion 334 can extend farther in the longitudinal direction L of the vehicle 10 than does the bottom wall 318. The first mounting hole 324 is located in the first portion 332 of the first side wall 320. The second mounting hole 326 can be located in the second portion 334 of the first side wall 320.

Referring to FIG. 5, the second side wall 322 can include a first portion 336 and a second portion 338. The first portion 336 of can be continuous with the bottom wall 318. The second portion 338 can extend farther in the longitudinal direction L of the vehicle 10 than does the bottom wall 318. The first mounting hole 328 can be located in the first portion 336 of the second side wall 322. The second mounting hole 330 can be located in the second portion 338 of the second side wall 322.

Referring to FIGS. 4 and 5, the first side wall 320 can extend in the transverse direction T of the vehicle 10 and can terminate at a first rear edge 340. The first rear edge 340 can have an irregular shape that generally conforms to the profile of a portion of the transverse frame assembly 82 on which the first side wall 320 is mounted. However, the first rear edge 340 can abut directly against the transverse frame assembly, or the first rear edge 340 can be spaced apart from the transverse frame assembly 82 at intervals. Referring to FIGS. 6, 7 and 10, the first rear edge 340 can extend along a portion of the first front cross frame member 118 and can extend along a portion of the plate 122.

Referring to FIGS. 4 and 5, the second side wall 322 can extend in the transverse direction T of the vehicle 10 to and can terminate at a second rear edge 342. The second rear edge 342 can have a substantially linear shape that generally conforms to the profile of a portion of a respective one of the first front frame members 76L, 76R on which the second side wall 322 is mounted. However, the second rear edge 342 can abut directly against the respective one of the first front frame members 76L, 76R, or the second rear edge 342 can be spaced apart from the respective one of the first front frame members 76L, 76R. Referring to FIGS. 6, 7 and 10, the second rear edge 340 can extend along a portion of the first front cross frame member 118 and can extend along a portion of the plate 122.

Referring to FIG. 5, the bottom wall 318 can extend in the transverse direction T of the vehicle 10 and can terminate at a third rear edge 344. The third rear edge 344 can include a linear edge 344a and a curved edge 344b.

The linear edge 344a can generally conform to the profile of a portion of the transverse frame assembly 82 on which the bottom wall 318 is mounted. However, the linear edge 344a can abut directly against the transverse frame assembly, or the linear edge 344a can be spaced apart from the transverse frame assembly 82 at intervals. Referring to FIGS. 6, 7, 10 and 11, the linear edge 344a can extend along a portion of the first front cross frame member 118 and can extend along a portion of the plate 122.

Referring to FIG. 6, the curved edge 344b can generally conform to the profile of a portion a respective one of the first front frame members 76L, 76R on which the bottom wall 318 is mounted. However, the curved edge 344b can abut directly against a respective one of the first front frame members 76L, 76R, or the curved edge 344b can be spaced apart from the respective one of the first front frame members 76L, 76R at intervals.

In the exemplary embodiment of FIGS. 1-11, the upper bumper bracket 106L, 106R can be welded onto the transverse frame assembly 32 and the first front frame members 76L, 76R. Referring to FIGS. 6 and 8-11, a weld 346 can connect the first rear edge 340 to the transverse frame assembly 82, the second rear edge 342 to the respective one of the first front frame members 76L, 76R, and the bottom edge 344 to each of the transverse frame assembly 82 and the respective one of the first front frame members 76L, 76R. The weld 346 can be a continuous weld, or a segmented weld. Further, the weld 346 can be formed from multiple welds that abut and/or overlap at portions.

Although the upper bumper brackets 106L, 106R of the exemplary embodiment of FIGS. 2-12 are connected to the front frame assembly 32 by one or more welds, exemplary embodiments are intended to include or otherwise cover any appropriate connection between the upper bumper brackets 106L, 106R and the front frame assembly 32 such as but not limited to mechanical fasteners, adhesive, etc.

In the exemplary embodiment of FIGS. 2-12, the front bumper assembly 34 can be connected to the remainder of the front frame assembly 32 by threaded fasteners. This connection structure can facilitate removal of a damaged front bumper assembly 34. Further, the front bumper assembly 34 can be replaced without the need to replace further structures of the front frame assembly 32. The threaded fasteners also can facilitate installation of a replacement bumper assembly 34.

Figure 9:
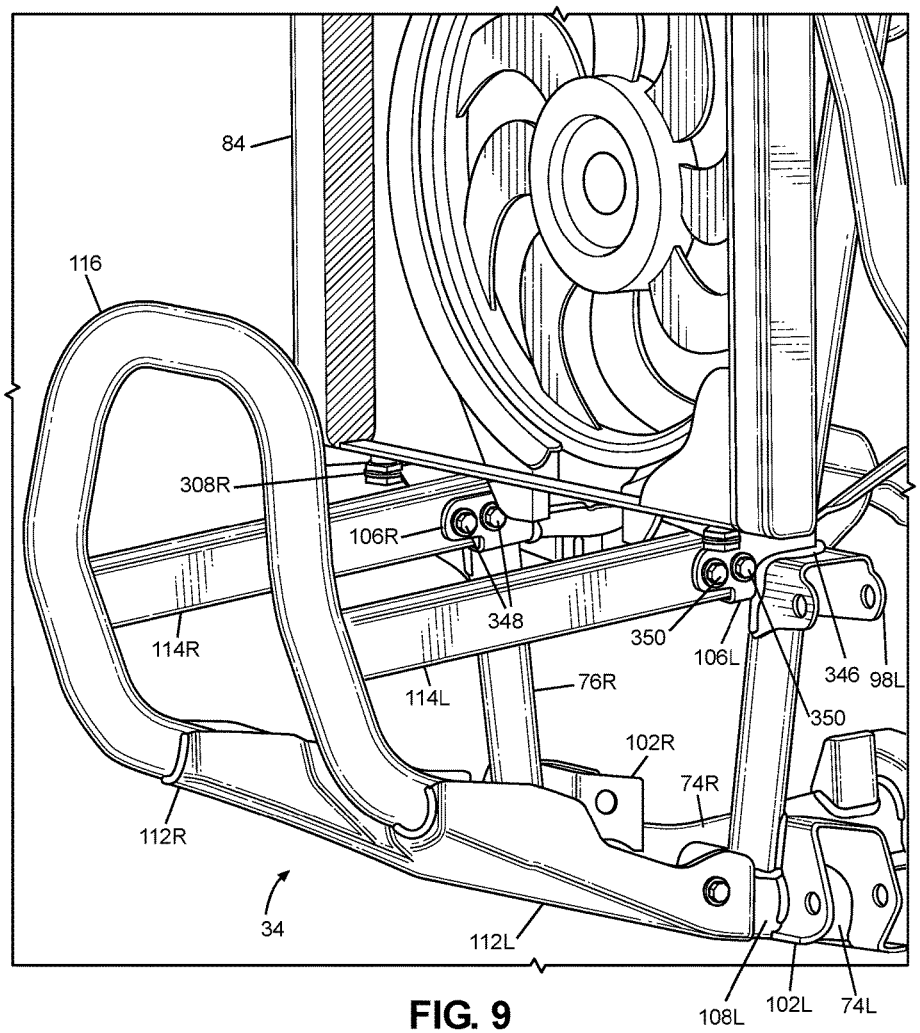
FIG. 9 is a perspective view of an enlarged portion of FIG. 3 showing the radiator assembly and the front bumper assembly connected to the upper bumper brackets. The front suspension and wheel assembly is removed for clarity and simplicity of the drawing.

Referring to FIGS. 4-7 and 9-11, a pair of nuts 348 can be welded onto the first side wall 320 around each of the mounting holes 324, 326. Referring to FIGS. 8, 9 and 11, a pair of bolts 350 can pass through a respective one the mounting holes 328, 330 of the second side wall 322, can pass through a respective one of the mounting holes 324, 326 in the first side wall 320 and can be threaded into a respective one of the nuts 348.

Each of the upper connector members 114L, 114R can be a hollow pipe having a generally rectangular cross-sectional shape. Referring to FIG. 11, a compression limiting structure 352 can be secured inside each of the upper connector members 114L, 114R at locations that extend adjacent to the bolts 350. The compression limiting structure 352 can be configured to limit deformation of the hollow connector members 114L, 114R. For example, the compression limiting structure 352 can span the hollow cavity of a respective one the upper connector members 114L, 114R, and can have a material strength sufficient to resist deformation if any bolt 350 is over-tightened into the nuts 348.

Each of the upper bumper brackets 106L, 106R can be stamped from a flat sheet. The bottom wall 318 can be a flat plate that extends along the longitudinal direction L and transverse direction T of the vehicle 10. Each of the side walls 320, 322 can be a flat plate that is continuous with and extends from the bottom wall 318, and each of the side walls 320, 322 can extend along the longitudinal direction L and vertical direction V of the vehicle 10. Each of the side walls 320, 322 can be spaced apart in the transverse direction T of the vehicle 10. The flange 312 can be a flat plate that extends in the longitudinal direction L and transverse direction T of the vehicle 10. The flange 312 can extend from the second side wall 322 in the transverse direction T of the vehicle 10. The flange 312 can be spaced away from the bottom wall 318 in the vertical direction V of the vehicle 10.

In the exemplary embodiment of FIGS. 2-12, the upper bumper brackets 106L, 106R are configured as mirror images of each other. However, exemplary embodiments are intended to include or otherwise cover an upper bumper bracket that includes at least one axis of symmetry such that the same bumper bracket can be mounted to either of the first front frame members 76L, 76R by merely rotating the orientation of the right-side upper bumper bracket relative to the left-side bumper bracket prior to securing the brackets to the first front frame members 76L, 76R. For example, the flange 312 could be configured to be rectangular instead of curved as in the exemplary embodiment of FIGS. 2-12, the hole 314 could be centered within the flange 312, and the front edges and rear edges of the brackets 106L, 106R can be configured identically such that each the front and rear edges are of equal length and identical shape. As a result, the right-side upper bumper bracket could be rotated about an axis extending in the vertical direction of the vehicle 10 by 180 degrees relative to the left-side upper bumper bracket. Thus, only one design could provide both upper bumper brackets.

Further, the exemplary upper bumper brackets 106L, 106R can be configured as a homogenous, single piece. However, exemplary embodiments are intended to include or otherwise cover an upper bumper bracket that includes a flange 312 that is manufactured separately from the walls 318, 320, 322 and is subsequently mounted onto the respective one of the first front frame members 76L, 76R to abut the walls 318, 320, 322. The same flange design could be used for the left-side flange and the right-side flange of the front frame assembly 32 because the right-side flange could be flipped 180 degrees relative to the left-side flange about an axis extending in the longitudinal direction L of the vehicle 10. Further, each of the walls 318, 320, 322 can be manufactured separately and subsequently mounted onto respective one(s) of the first front frame members 76L, 76R and transverse frame assembly 82.

G. Rear Frame Assembly

Referring to FIG. 2, the rear frame assembly 36 can include a plurality of rear frame members 190, 192, 194, 196L, 196R, 198, 200, 202L, 202R, 204L, 204R, 206L, 206R, 208L, 208R. The rear frame members 190, 192, 194, 196L, 196R, 198, 200, 202L, 202R, 204L, 204R, 206L, 206R, 208L, 208R can be configured to define a lower cradle assembly, an upper bed support assembly, and a suspension support assembly. The lower cradle assembly can be configured to mount and supporting the power source and a portion of the rear suspension and wheel assembly in any appropriate manner. The upper bed support can be configured to support a storage area of the vehicle 10. The suspension support assembly can be configured to support another portion of the rear suspension and wheel assembly.

III. Front and Rear Suspension and Wheel Assemblies

The vehicle 10 can include a front suspension and wheel assembly and a rear suspension and wheel assembly. As discussed above, the front suspension and wheel assembly can be connected to the front frame assembly 32. At least a portion of the rear suspension and wheel assembly can be mounted to the rear frame assembly 36.

Referring to FIG. 3, the suspension members 90L, 90R, 92L, 92R of the front suspension and wheel assembly can be configured as a double-wishbone suspension system (also referred to as upper and lower A-arms). Each of the suspension members 90L, 90R, 92L, 92R includes a pair of mounting points configured to be connected to a respective pair of the suspension brackets 100L, 100R, 102L, 102R. Each of the suspension members 90L, 90R, 92L, 92R can further include a single mounting point configured to be connected to a wheel hub or knuckle that can rotatably support a respective one of the front wheels 14L, 14R. However, exemplary embodiments are intend to include or otherwise cover suspension members that provide a different geometry and/or include multiple links, a strut, or other appropriate members in order to achieve the desired suspension performance so long as at least one of the suspension members on each side of the front frame assembly 32 is mounted to a suspension mounting bracket in accordance with the first upper mounting brackets 98L, 98R.

The rear suspension and wheel assembly can include the rear wheels 16L, 16R and at least one suspension member for each of the rear wheels 16L, 16R. The rear suspension and wheel assembly can include any appropriate suspension members, such as those described above for the front suspension and wheel assembly. Further, the rear suspension and wheel assembly can have the same type of suspension members as the front suspension and wheel assembly, or can have a different type of suspension members as compared to the front suspension and wheel assembly. For example, the rear suspension and wheel assembly can include a first rear suspension member, a second suspension member and a third suspension member connected on each side of the rear frame assembly 36. The first and second suspension members can be connected to each of the rear frame assembly 36 and a respective one of the rear wheels 16L, 16R. The third rear suspension member can be connected to a rear end portion of the main frame assembly 30 and connected to the respective one of the rear wheels 16L, 16R. In another exemplary embodiment, the rear suspension and wheel assembly can include the first, second and third suspension members described above, and can additionally include a fourth suspension member connected on each side of the rear frame assembly. However, exemplary embodiments are intended to include or otherwise cover a rear suspension and wheel assembly that includes at least one rear suspension member connected to the rear frame assembly 36.

IV. Steering Assembly

The vehicle 10 can include a steering assembly configured to transfer steering inputs from an operator in the passenger compartment of the main frame assembly 30 to the front wheels 14L, 14R. Referring to FIG. 3, the steering assembly can include a steering wheel, a steering column assembly 168, a steering rack assembly 86, and a pair of tie rods. (The steering column assembly 168 is shown in phantom in FIG. 3. Only the left-side tie is shown in FIG. 3; the right-side tie rod is obstructed from view in FIG. 3).

The steering rack assembly 86 can be mounted to and supported by the transverse frame assembly of the front frame assembly 32. That is, the front frame assembly 32 can include the steering rack assembly 86. The tie rods can be coupled to the steering rack assembly 86 and to a respective one of the front wheels 14L, 14R. The steering column assembly 168 can pass through an opening in the plate 122 so that one end can be connected to the steering rack assembly 86 and a second end can be located in the passenger compartment of the main frame assembly 30. The steering wheel can be connected to the second end of the steering column assembly 168.

V. Final Drive Assembly

The final drive assembly 88 can transfer torque output by the power source to each of the front wheels 14L, 14R by any appropriate mechanism that can transmit torque input to the mechanism to each of the front wheels 14L, 14R. For example, the housing can contain an input structure and an output structure. The input structure can be configured to receive torque from a power source. The output structure can be configured to transfer at least a portion of the torque to at least one of the wheels 14L, 14R. The input structure can include an input gear driven by the power source. The output structure can be an output gear driven by the input gear. The output gear can drive one or each of a pair of driveshafts. Each of the driveshafts can drive a respective one of the front wheels 14L, 14R. In another example, a differential gear assembly can couple the output gear to each of the driveshafts such that each of the wheels 14L, 14R can be driven at different speeds and different percentages of the torque input by the power source. In yet another example, a plurality of friction members can be arranged such that torque input by the power source can be differentially distributed to each of the driveshafts.

The driveshafts can include one or more shaft segments and at least one of the shaft segments extends into a respective one of the openings 184. That is, each of the driveshafts can be connected to the output structure contained within the housing 182. The driveshafts can be coupled to the output structure mounted inside of the housing 182 and to a respective one of the front wheels 14L, 14R in any appropriate manner such as but not limited to universal joints, constant-velocity joints, splines, combinations thereof, or via other known output coupling structures.

VI. Alternative Embodiments

While certain embodiments of the invention are described above, and FIGS. 1-15 disclose a best mode for practicing the various inventive aspects, it should be understood that the invention can be embodied and configured in many different ways without departing from the spirit and scope of the invention.

For example, embodiments are disclosed above in the context of a vehicle 10 shown in FIG. 1. However, the invention is intended to cover any type of vehicle. For example, the vehicle can be any type of vehicle configured for travel on an improved surface such as but not limited to a paved road, as well as unimproved surfaces, such as gravel paths, dirt paths, or even unmarked paths.

The front frame assembly 32 can be configured in various ways to sustain load or kinetic energy inputs from a front suspension and wheel assembly while also being capable of responding in a predetermined and controlled manner to a load or kinetic energy input in the longitudinal direction L of the vehicle 10. For example, one or both of the first and second frame members can be made from a plurality of parts or made as a unitary homogenous component.

The first and second frame members can also be differently shaped while falling within the scope of the presently disclosed subject matter. For example, the first frame members and the second frame members can be divided differently as compared to the first and second frame members described above. The first frame member can terminate at a junction with the second frame member, and the second frame member can include a second end that is connected to the main frame assembly. Further, the first frame member or the second frame can be connected to any appropriate portion of the main frame assembly.

Embodiments are disclosed above in the context of vehicle 10 shown in FIG. 1 having a front frame assembly that includes a front bumper assembly. However, the vehicle could include a rear bumper assembly, a rear suspension and a rear wheel assembly all configured in a similar manner as described above with respect to the front frame assembly, the front bumper assembly and the front suspension and wheel assembly.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A mounting assembly for connecting each of a bumper assembly and a radiator assembly to a vehicle, the bumper assembly including a connector member extending along a longitudinal direction of the vehicle, the mounting assembly comprising:
    a first frame member extending along a vertical direction of the vehicle;
    a transverse frame member extending in a transverse direction of the vehicle and connected to the first frame member; and
    a bumper bracket configured to connect the connector member of the bumper assembly to each of the first frame member and the transverse frame member, the bumper bracket including a flange extending in the transverse direction of the vehicle, and the flange being configured to engage the radiator assembly mounted on the vehicle.

2. The mounting assembly according to claim 1, wherein the bumper bracket includes a first portion mounted on each of the transverse frame member and the first frame member, the first portion has a substantially U-shaped cross-section that is open toward the radiator assembly when the flange engages the radiator assembly such that, when the bumper bracket connects the connector member to each of the first frame member and the transverse frame member, the connector member pushes upwardly along the vertical direction of the vehicle and rearwardly along the longitudinal direction of the vehicle when a load or kinetic energy is applied to the connector member along the longitudinal direction of the vehicle and the load or kinetic energy exceeds a predetermined threshold value.

3. The mounting assembly according to claim 1, wherein the flange includes a mounting hole configured to receive a mating structure of the radiator assembly mounted on the vehicle.

4. The mounting assembly according to claim 1, wherein
    the bumper bracket includes a first portion mounted on each of the transverse frame member and the first frame member, and
    the first portion includes a bottom wall, and a pair of side walls that are connected to the bottom wall, and the side walls are spaced apart from each other by a gap,
    the gap is configured to receive the connector member, and
    the flange is cantilevered to one of the side walls and extends away from the gap.

5. The mounting assembly according to claim 4, wherein each of the side walls includes a pair of mounting holes spaced apart in the longitudinal direction of the vehicle, and each of the mounting holes of one of the side walls is aligned with a respective one of the mounting holes of a different one of the side walls.

6. The mounting assembly according to claim 4, wherein the flange is substantially parallel to the bottom wall.

7. The mounting assembly according to claim 4, wherein each of the side walls is substantially parallel to each other.

8. The mounting assembly according to claim 1, wherein the bumper bracket includes a bottom wall and a pair of side walls,
    the bottom wall is a flat plate that extends along the longitudinal and transverse directions of the vehicle,
    each of the side walls is a flat plate that is continuous with and extends from the bottom wall, each of the side walls extends along the longitudinal and vertical directions of the vehicle, and each of the side walls is spaced apart in the transverse direction of the vehicle.

9. The mounting assembly according to claim 8, wherein each of the side walls includes a first portion and a second portion, the first portion of each of the side walls is continuous with the bottom wall, and the second portion of each of the side walls extends farther in the longitudinal direction than does the bottom wall, and
    each of the side walls includes a pair of mounting holes, one of the mounting holes is located in the first portion of each of the side walls, and a different one of the mounting holes is located in the second portion.

10. The mounting assembly according to claim 8, wherein the flange is a flat plate that extends in the longitudinal and transverse directions of the vehicle, the flange extends from one of the side walls in the transverse direction of the vehicle, and the flange is spaced away from the bottom wall in the vertical direction of the vehicle.

11. The mounting assembly according to claim 1, wherein the first portion of the bumper bracket further includes a pair of opposed mounting holes, and a threaded nut is welded onto the bumper bracket around one of the mounting holes.

12. A frame assembly of a vehicle comprising:
    a pair of first frame members extending upwardly along a vertical direction of the vehicle;
    a transverse frame member extending from each of the first frame members in a transverse direction of the vehicle;
    a pair of bumper brackets, each of the bumper brackets includes a first portion and a second portion, the first portion is connected to the transverse frame member and a respective one of the first frame members, and the second portion is configured to engage a radiator assembly when the radiator assembly is mounted on the frame assembly; and
    a pair of connector members, each of the connector members is connected to the first portion of a respective one of the bumper brackets, and each of the connector members extends along the longitudinal direction of the vehicle away from a respective one of the first frame members.

13. The frame assembly according to claim 12, wherein the first portion of each of the bumper brackets has a substantially U-shaped cross-section that is open toward the radiator assembly when each of the flanges engages the radiator assembly such that, when each of the bumper brackets connects a respective one of each of the connector members to each of the first frame member and the transverse frame member, each of the connector members pushes upwardly along the vertical direction of the vehicle and rearwardly along the longitudinal direction of the vehicle when a load or kinetic energy is applied to the connector member along the longitudinal direction of the vehicle and the load exceeds a predetermined threshold value.

14. The frame assembly according to claim 12, wherein
    the first portion of each of the bumper brackets includes a bottom wall, and a pair of side walls, each of the side walls includes at least one mounting hole such that the mounting holes are aligned with each other, and each of the connector members is connected to the at least one mounting hole of each side wall of each of the bumper brackets; and the second portion of each of the bumper brackets includes a flange and a mounting hole through the flange configured to engage a mating structure of the radiator assembly when each of the bumper brackets engages the radiator assembly, and the flange is cantilevered to one of the side walls.

15. The frame assembly according to claim 12, wherein the first portion of each of the bumper brackets includes a bottom wall and a pair of side walls, the side walls extend from and are continuous with the bottom wall, one of the side walls is connected to one of the first frame members, a different one of the side walls is connected to the transverse frame member, and the bottom wall is connected to the one of the first frame members; and the second portion of each of the bumper brackets includes a flange that extends from one of the side walls, is substantially parallel to the bottom wall, and extends away from each of the side walls in the transverse direction of the vehicle.

16. The frame assembly according to claim 12, further comprising
a pair of lower frame members extending along a longitudinal direction of the vehicle,
wherein each of the first frame members extends from a respective one of the lower frame members.

17. An all-terrain vehicle comprising:
a frame assembly including,
    a main frame assembly defining a passenger compartment of the all-terrain vehicle,
    a rear frame assembly connected to and extending from a rear end of the main frame assembly in a longitudinal direction of the all-terrain vehicle, and
    a front frame assembly connected to and extending from a front portion of the main frame assembly of the vehicle such that the main frame assembly extends between the front frame assembly and the rear frame assembly in a longitudinal direction of the vehicle, the front frame assembly including,
        a pair of first frame members extending upwardly along a vertical direction of the vehicle,
        a transverse frame member extending in a transverse direction of the vehicle and connected to each of the first frame members,
        a pair of bumper brackets including a first portion and a second portion, the first portion is connected to the transverse frame assembly and a respective one of the first frame members, and
        a pair of connector members each connected to the first portion of a respective one of the bumper brackets, and extending in a longitudinal direction of the vehicle away from the transverse frame member; and a radiator assembly connected to each of the first frame members and engaging the second portion of the each of the bumper brackets;
a rear suspension and wheel assembly mounted to the rear frame assembly; and
a front suspension and wheel assembly mounted to the front frame assembly,
wherein the bumper brackets are open toward the radiator assembly such that the connector members pivot upwardly and displace the radiator assembly upwardly and away from the front bumper assembly when the front bumper assembly is subjected to a load or kinetic energy input that causes the front bumper assembly to collapse toward the main frame assembly.

18. The all-terrain vehicle according to claim 17, wherein
the second portion of each of the bumper brackets includes a flange and a mounting hole through the flange, and
the radiator assembly includes a pair of posts, each of the posts extends into the mounting hole of a respective one of the bumper brackets.

19. The all-terrain vehicle according to claim 17, wherein
the first portion of each of the bumper brackets has a substantially U-shaped cross-section and includes a bottom wall and a pair of side walls extending from the bottom wall, one of the side walls is mounted on the transverse frame member, and a different one of the side walls is mounted on a respective one of the first frame members, and
the second portion of each of the bumper brackets includes a flange extending from one of the side walls in the transverse direction of the vehicle, and
each of the connector members extends between and is mounted to each of the side walls of a respective one of the bumper brackets.

20. The all-terrain vehicle according to claim 17, wherein
each of the bumper brackets includes a first pair of mounting holes and a second pair of mounting holes, each of the second pair of mounting holes opposes a respective one of the first pair of mounting holes,
a pair of fasteners passes through each of the connector members, each of the fasteners passes through a respective one of the first pair of mounting holes and a respective one of the second pair of mounting holes,
each of the connector members is a hollow tube having an inside, and
the front bumper assembly further includes a pair of compression stoppers, each of the compression stoppers is fixed inside a respective one of the connector members, each of the compression stoppers spans opposing portions of the inside of the respective one of the connector members, and the pair of fasteners passes through each of the opposing portions of the inside of the respective one of the connector members.

* * * * *